(12) United States Patent
Toyoda et al.

(10) Patent No.: US 6,765,697 B2
(45) Date of Patent: Jul. 20, 2004

(54) IMAGE READER (75) Inventors: Keiko Toyoda, Toyokawa (JP);
Noritoshi Maruchi, Toyokawa (JP)

(73) Assignee: Minolta Co., Ltd., Osaka (JP)

(*) Notice: Subject to any disclaimer, the term of this patent is extended or adjusted under 35 U.S.C. 154(b) by 709 days.

(21) Appl. No.: 09/781,979

(22) Filed: Feb. 14, 2001

(65) Prior Publication Data
US 2001/0030776 A1 Oct. 18, 2001

(30) Foreign Application Priority Data

Feb. 21, 2000 (JP) .................................. 2000-042137

(51) Int. Cl.[7] .................................................. H04N 1/04
(52) U.S. Cl. ..................... 358/471; 358/496; 358/406
(58) Field of Search .................. 358/496, 498, 358/471, 473, 474, 487, 505, 506, 483, 482, 512–514, 463, 406, 504; 382/108, 312, 313, 318, 319; 427/108, 110, 164, 165, 168, 169; 399/379, 380, 367, 11–13

(56) References Cited

U.S. PATENT DOCUMENTS 5,930,008 A * 7/1999 Nabeshima et al. ........ 358/496
6,128,105 A * 10/2000 Ishikawa et al. ............ 358/483
6,563,938 B1 * 5/2003 Harada ....................... 382/108

FOREIGN PATENT DOCUMENTS

JP     62-293236     12/1987
JP     7-306478     11/1995
JP     10-327296     12/1998

* cited by examiner

*Primary Examiner*—Cheukfan Lee
(74) *Attorney, Agent, or Firm*—Morrison & Foerster LLP (57) ABSTRACT

The present invention is to provide an image reader including a transparent substrate, which can be used effectively for an extended lifetime. The image reader comprises a transparent substrate and a stationary image pickup opposed to the transparent substrate for reading an image of an original document while the document is being transported between the transparent substrate and the stationary image pickup. The transparent substrate can be turned around and/or upside down relative to the image pickup in order to use the transparent substrate for an extended its service time. Also, the transparent substrate includes at least one first indicator showing an arrangement order how the transparent substrate has been turned around relative to the image pickup.

23 Claims, 6 Drawing Sheets

IMAGE READER

This application is based upon application No. 2000-42137 filed in Japan on Feb. 21, 2000, the contents of which are hereby incorporated by reference.

BACKGROUND OF THE INVENTION

1) Technical field of the Invention

The present invention relates to an image reader for reading an image on an original document for use with an image reproducing device such as a copy machine, a printer, a facsimile machine and a scanner. In particular, the present invention relates to an image reader for reading the image on the original document through a transparent substrate such as platen glass, while the original document is being transported on and along the transparent substrate.

2) Description of Related Arts

The conventional image readers are categorized into two types according to an image reading methods. One type of image reader includes a movable image reading element moving back and forth behind a transparent substrate or platen on which an original document is transported to a predetermined reading region. The document is maintained in the reading region while the movable reading element moves across the document to read its image. The first type of image reader incorporating the movable image reading element is referred to as "movable image reader" hereinafter as required. The other type of the image reader includes a stationary image reading element behind the transparent substrate, in which the original document is transported on the transparent substrate while the stationary image reading element reads the image of the original document. The second type of the image reader incorporating the stationary image reading element is referred to as "stationary image reader" hereinafter as required.

The movable and stationary image readers have respective advantages and disadvantages. For example, a spot on the transparent substrate is reproduced on a resultant image in different ways. Specifically, according to the movable image reader, since the original document is fixed to the transparent substrate, the spot on the substrate is reproduced as it is on the resultant image. Therefore, the spot, if it is so small, hardly deteriorates the resultant image quality. Contrary to this, according to the stationary image reader, since the original document is moved relative to the substrate, even the small spot on the substrate is reproduced into an unwanted line extending along the scanning direction, causing a harmful deterioration in the resultant image.

For this reason, the transparent substrate of the stationary image reader has a surface covered by a protection layer in order to prevent the creation of permanent spot on the substrate. Unfortunately, the repetition of the frictional contact with the documents wears the protection layer, which causes the transparent substrate to be spotted and thereby creates the unwanted lines on the resultant images.

To prevent this, the transparent substrate should be exchanged by a new one after the formation of the unwanted lines. However, the transparent substrate is so expensive that a frequent exchange of the transparent substrate increases the cost for reading. Accordingly, a demand has been existed to develop a image reader or image reproducing device, in which the transparent substrate can be available for an extended lifetime.

SUMMARY OF THE INVENTION

Accordingly, a first object of the present invention is to provide an improved transparent substrate of a stationary image reader, which can be used effectively for an extended lifetime.

A second object of the present invention is to provide the improved transparent substrate having a protection layer which is less wearable but also harmless against a smooth reading of the original document.

To achieve the aforementioned first object of the present invention, an image reader according to the first aspect, comprises a transparent substrate having a first surface and a second surface opposing to the first surface, at least one of the surfaces having a protection layer; a document transporting device for transporting a document along the first surface of the transparent substrate; and an image pickup device positioned adjacent to the second surface and for picking up an image of the document transported along the first surface of the transparent substrate; wherein the transparent substrate can be turned around relative to the image pickup device, wherein the transparent substrate has a first indicator showing how the transparent substrate has been turned around relative to the image pickup device. Thus, even after a region of the protection layer of the transparent substrate has been worn out, since the transparent substrate can be turned around relative to the image pickup, the image reader can read the original document through another active region of the protection layer. Therefore, the transparent substrate can be effectively used for an extended time period before replacing with a new one.

To achieve the aforementioned second object of the present invention, an image reader according to the second aspect, comprises a transparent substrate having a first surface and a second surface opposing to the first surface, the first surface having a protection layer; a document transporting device for transporting a document along the first surface of the transparent substrate; and an image pickup device positioned adjacent to the second surface and for picking up an image of the document transported along the first surface of the transparent substrate; wherein the protection layer contains a silicone oil and a compound with per-fluoro-alkyl group. Thus, the silicone oil allows the protection layer to endure the active friction generated during repeatedly transporting original documents, resulting in delaying the abrasion thereof, and the per-fluoro-alkyl group containing compound keeps the blur and/or the dust away from the protection layer.

Further scope of applicability of the present invention will become apparent from the detailed description given hereinafter. However it should be understood that the detailed description and specific examples, while indicating preferred embodiments of the invention, are given by way of illustration only, since various changes and modifications within the sprit and scope of the invention will become apparent to those skilled in the art from this detailed description.

BRIEF DESCRIPTION OF THE DRAWINGS

The present invention become more fully understood from the detailed description given hereinafter and accompanying drawings which are given by way of illustration only, and thus are not limitative of the present invention and wherein.

DETAILED DESCRIPTION OF THE PREFERRED EMBODIMENTS

Embodiment 1

Figure 1:
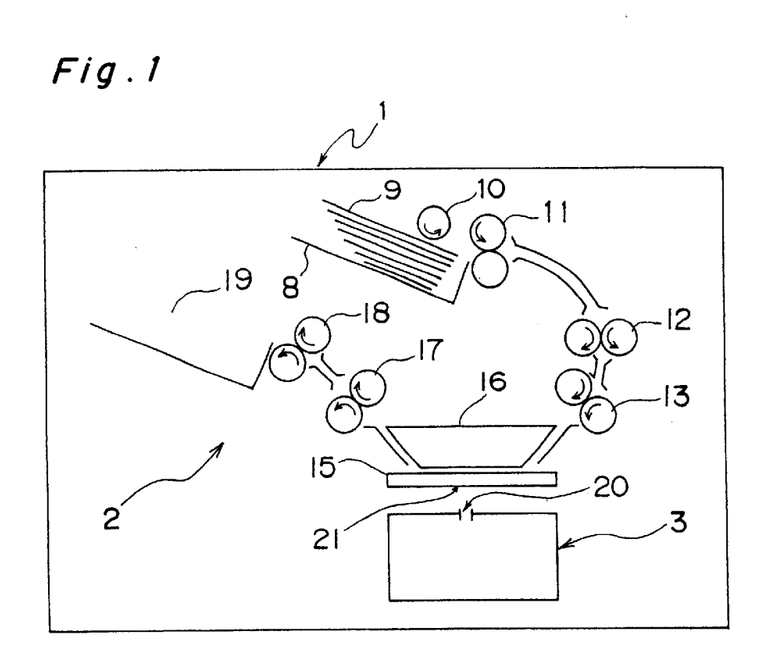
FIG. 1 is a schematic view of an image reader according to the present invention.

Referring to FIGS. 1 to 5, preferred embodiments of an image reader according to the present invention will be described hereinafter. FIG. 1 schematically shows an image reader of the present invention, generally indicated by reference numeral 1. The image reader 1 generally includes a document feeder generally indicated by reference numeral 2, and an image pickup generally indicated by reference numeral 3.

In operation of the image reader 1, a feed tray 8 supports one or more original documents 9 stacked thereon. The topmost document 9 in the feed tray 8 is picked and transported into the image reader 1 by feed rollers 10 and then separated from the subsequent documents to prevent the double feed of the documents 9. The original document 9 is further transported by another feed rollers 12 to registration rollers 13 where it is stopped momentarily. Subsequently, by rotation of the registration rollers 13, the original document 9 arrives at a transparent substrate (platen) 15 preferably made from a transparent plate. Then, the original document 9 advances along the transparent substrate 15 as it makes a frictional contact therewith and through a small gap or passage between the transparent substrate 15 and a backup member 16 positioned above the transparent substrate 15.

The image pickup 3 includes a reading window or slot 20 extending perpendicularly to the document transporting direction 26. The image pickup 3 reads, through the window 20, incremental portions of the image on the original document moving past a reading or pickup position 21 that opposes to the reading window 20. For picking up image, the image pickup 3 includes an image pickup element made of generally available photodetector such as a CCD sensor or a line sensor. The original document 9, after the image thereof has been picked up, is nipped and pulled by transport rollers 17 at the leading edge and then discharged onto a discharge tray 19 by rotation of discharge rollers 18.

Figure 2A:
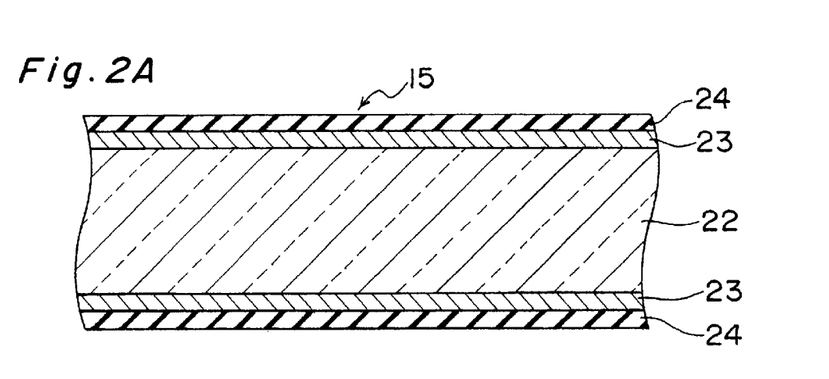
FIGS. 2A and 2B are enlarged cross sectional views of the transparent substrate incorporated into the image reader shown in FIG. 1.
Figure 2B:
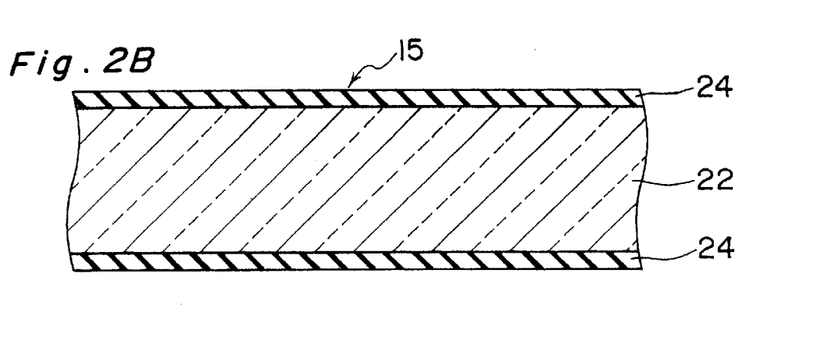

FIGS. 2A and 2B are enlarged cross sectional views of the transparent substrates 15 according to the present invention. The transparent substrate 15 has a rectangular glass plate 22. For example, the glass plate 22 may have a width of 46 mm in the transporting direction 26, a length of 350 mm perpendicular to the transporting direction 26, and a thickness of 3 mm. The transparent substrate 15 may have both surfaces, each of which supports or bears transparent conductive layers 23 (lower layers) and transparent protection layers 24 (upper layers). The transparent conductive layers 23 are grounded to the earth in order to evacuate static charges generated by frictional contact with the original document 9 from the transparent substrate 15. The transparent conductive layers 23 may be formed by any suitable technique such as sputtering tin oxides, indium oxides, and tin doped indium. The protection layers 24 may also be formed in any suitable way by dipping the transparent substrate 15 into a chemical bath. Although transparent conductive layers 23 and protection layers 24 are formed on both surfaces as illustrated in FIG. 2A, they may be provided on either one of surfaces. Alternatively, as shown in FIG. 2B, only the protection layer 24 may be formed on both surfaces of the glass plate 22.

FIGS. 3A to 3D show the transparent substrate 15 and the pickup position 21 on which an image of the original document 9 is picked up. In the drawings, the original document 9 is to be transported in the document transport direction 26, i.e., the direction from right to left in the drawings. The transparent substrate 15 is fixed so that a portion thereof positioned on the downstream side with respect to the document transport direction 26 opposes to the pickup position 21. In other words, a mid-portion X of the transparent substrate 15 is located on the upstream side of the pickup position 21 with respect to the document transport direction 26. For example, when the transparent substrate 15 has the width of 46 mm in the document transport direction 26, the reading position 21 is located at a position 17.5 mm away from the downstream edge of the transparent substrate 15.

Preferably, in order to attain a precise reading of the original document 9, the original document 9 advances past the pickup position 21, leaving a constant gap from the image pickup 3. For this purpose, the shape, size, and position of the image backup 3 and, if necessary, the neighboring parts are determined so that the original document 9 needs a stable and even contact with the opposing surface of the transparent substrate 9.

Also, the backup member 16 as well as the transparent substrate 15 is designed so that a leading portion of the original document 9 moving between the transparent substrate 15 and the backup member 16 suffers a reduced frictional force by the contact with the transparent substrate 15. However, once the leading of the original document 9 is nipped and then drawn by the transport rollers 17 mounted above and the downstream side of the transparent substrate 15, the original document 9 is curved upward in the vicinity of the downstream edge of the backup member 16. Therefore, the curved portion of the original document 9 is forced to the opposing portion of the transparent substrate 15 in the vicinity of the downstream edge of the backup member 16, which results in a greater frictional force between the transparent substrate 15 and the original document 9. To this end, the repetition of the frictional contact of the original document 9 wears a corresponding portion of the protection layer 24 of the transparent substrate 15 in the region indicated by D1 in FIG. 3A. This deteriorates the protection feature of the worn portion of the protection layer 24, allowing ink or printing material to offset or adhere to the worn portion so that undesired black lines are often observed on the reproduced images.

Figure 4A:
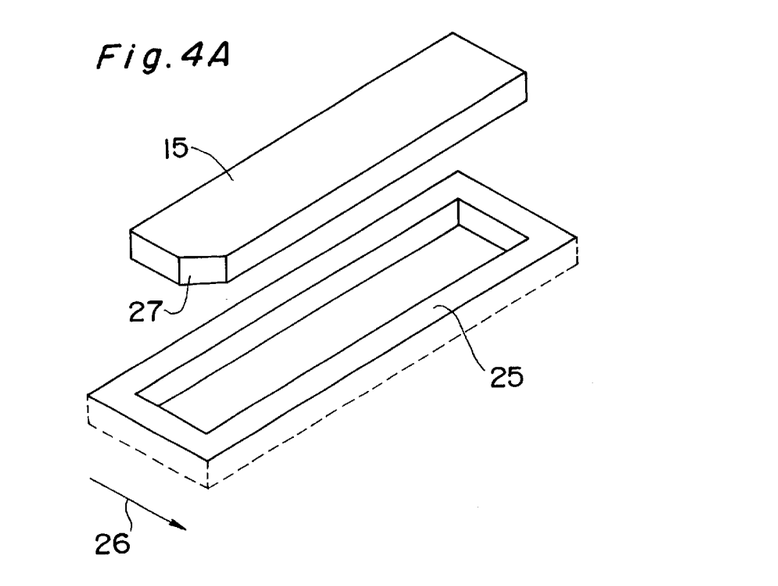
FIG. 4A is a perspective view of the transparent substrate and the support frame which are releasably secured to each other.

As described above, the transparent substrate 15 has a limited lifetime, in which the protection layer 24 can effectively and sufficiently prevent spots from adhering on the transparent substrate 15. Conventionally, when the transparent substrate 15 has reached its lifetime, it is replaced with a new one. In the image reader 1 according to the present invention, however, when the limited portion D1 indicated in FIG. 3A has completes its lifetime, the transparent substrate 15 is turned around (i.e., rotated 180 degree about the axis perpendicular to the surface of a support frame 25) and/or turned upside down relative to the support frame 25. In other words, as illustrated in FIG. 4A, the transparent substrate 15 is detachably or releasably secured with the support frame 25 so that the inactive region of the transparent substrate 15 is positioned out of the contact region. The cutout 27 shows the positional relation between the transparent substrate 15 and the support frame 25. Thus, another active portion of the transparent substrate 15 opposing to the reading position 21 effectively prevents the spots from adhering to the transparent substrate 15, ensuring the reproduction of images free from defects, without any need to replace the whole transparent substrate 15 with a new one. The lifetime of the transparent substrate 15 is extended considerably, i.e., double or fourfold.

Figure 4B:
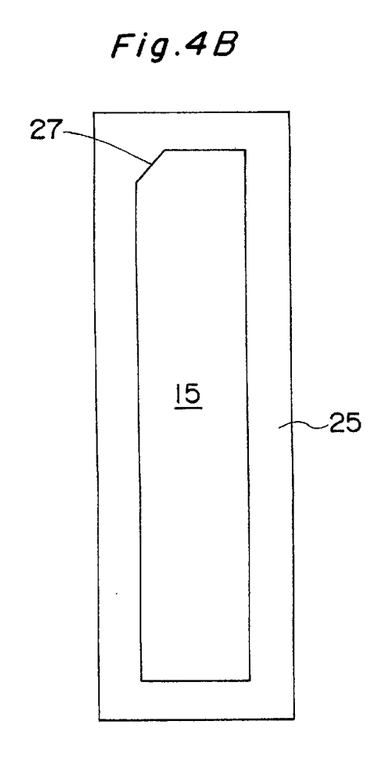
FIGS. 4B and 4C are plan views of support frames detachably supporting the transparent substrates with a first indicator at the corner thereon.
Figure 4C:
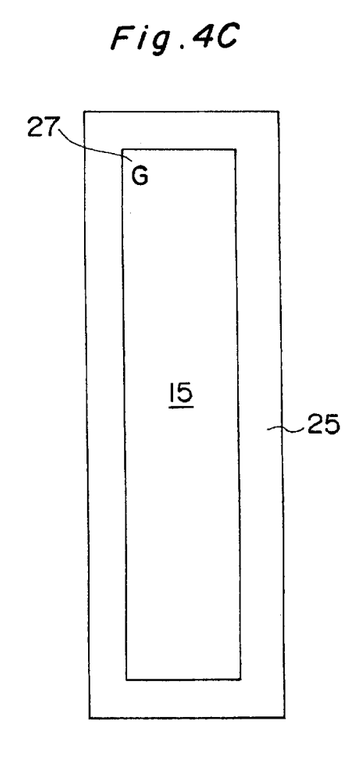

Since the transparent substrate 15 is made of transparent material as described above, a question may arise which surface region of the transparent substrate 15 is now positioned having a contact region with the document moving past the reading position 21. To encounter this problem, the transparent substrate 15 has at least one specific indicator or feature 27 that shows which surface region of the transparent substrate 15 is now in the contact region. For example, as shown in FIGS. 4B and 4C, the indicator 27 may be a cutout (or recess) or another marking such as ornamental patterns, alphabet, and number. In addition, as shown in FIGS. 5A to 5D, the support frame 25 may be provided at or around its corners with corresponding indicators or features 28 indicating an arrangement order of the transparent substrate 15, which in combination with the indicator 27 of the transparent substrate 15 provides operators with a good guidance showing which surface portion is now positioned in the contact region and further which surface portion is to be positioned at the contact region.

Figures 5A, 5B:
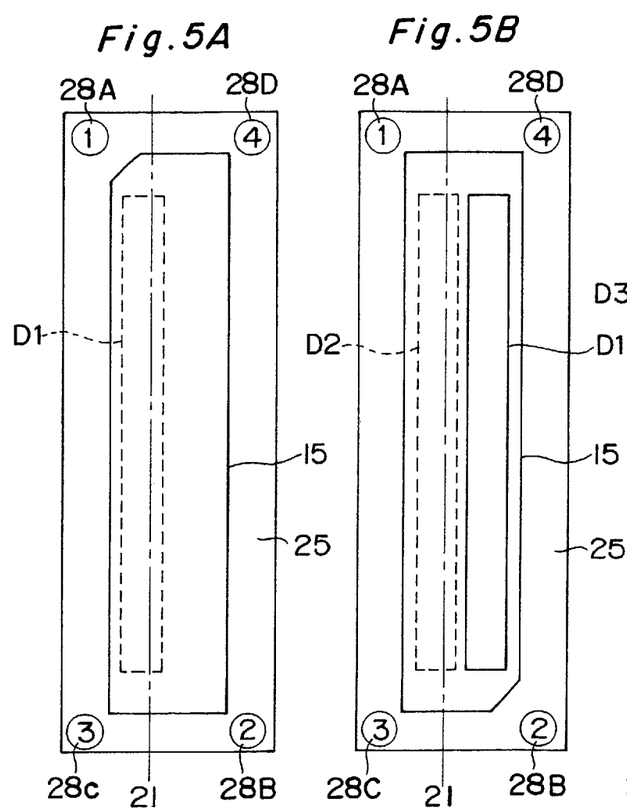
FIGS. 5A through 5D are plan views of the transparent substrate and a support frame with second indicators at the corners thereon, showing a sequence how the transparent substrate is to be turned around and/or turned upside down relative to the support frame.

Referring to FIGS. 5A to 5D, procedures for changing the arrangement of the transparent substrate 15 will be described hereinafter. FIG. 5A shows the combination of the frame and a new transparent substrate 15 mounted on the support frame 25. Also, a first surface region D1 of the transparent substrate 15 positioned in the contact region is shown by dotted lines in which the corner cutout is positioned adjacent to the indicator 28A as shown by ① of the support frame 25. In this instance, each original document 9 transported to the reading position 21 makes a frictional contact with the surface region D1. Then, as a result of a number of repetitions of the image reading, the protection layer 24 in the surface region D1 is worn out to eventually complete its lifetime. The fact that the transparent substrate 15 has completed its lifetime can be determined by appearance of unwanted lines in the resultant reproduced images, notwithstanding an ordinary cleaning of the transparent substrate 15.

Figure 3A:
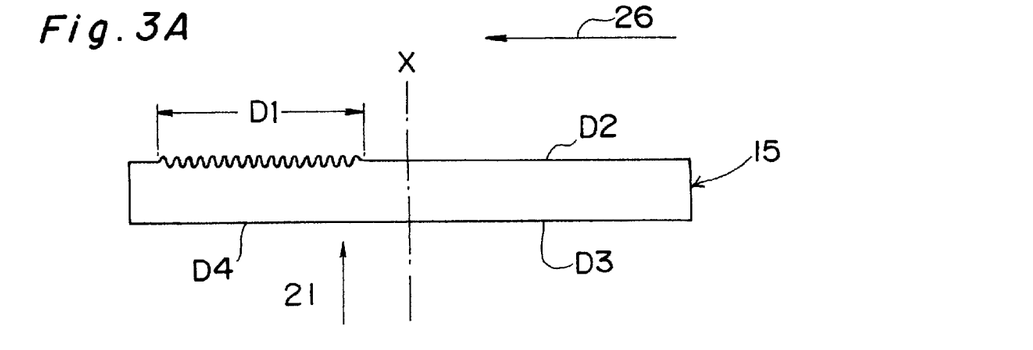
FIGS. 3A through 3D are enlarged cross sectional views of the transparent substrate incorporated into the image reader shown in FIG. 1, showing an inactive region(s) of the protection layer of the transparent substrate.
Figure 3B:
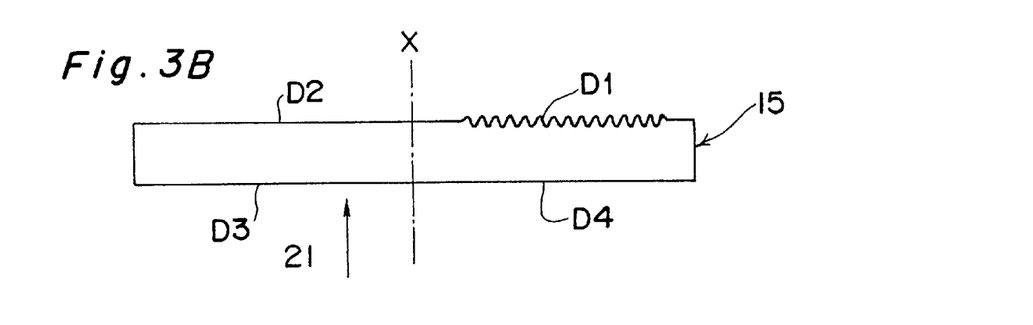

When it is found that the transparent substrate 15 has completed its lifetime, as shown in FIGS. 5A and 5B the transparent substrate 15 is turned around (i.e., rotated 180 degree about the axis perpendicular to the surface of the support frame 25) relative to the support frame 25. This allows the corner cutout to face the second indicator 28B as shown by ② of the support frame 25. In this arrangement, the inactive (worn or dead) first surface region D1 shown by the solid lines in FIG. 5B and by corrugated line in FIG. 3B is placed out of a reading region opposing to the reading position 21 and, instead, an another active (intact or alive) surface region shown by the dotted lines in FIG. 5B is positioned in the reading region. The above positional change of the transparent substrate 15 deserves the conventional replacement with a new transparent substrate 15, which substantially doubles the lifetime of the transparent substrate 15.

Figure 5C:
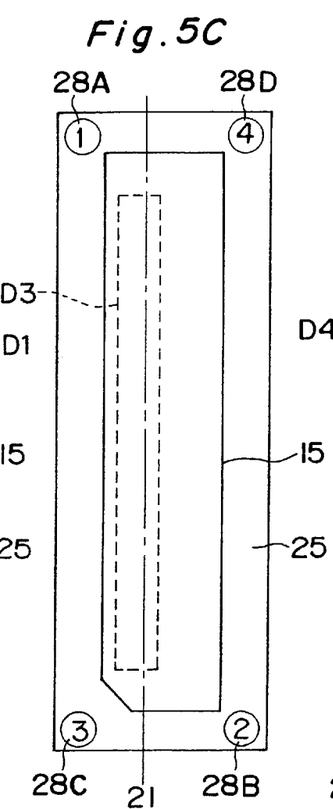
Figure 5D:
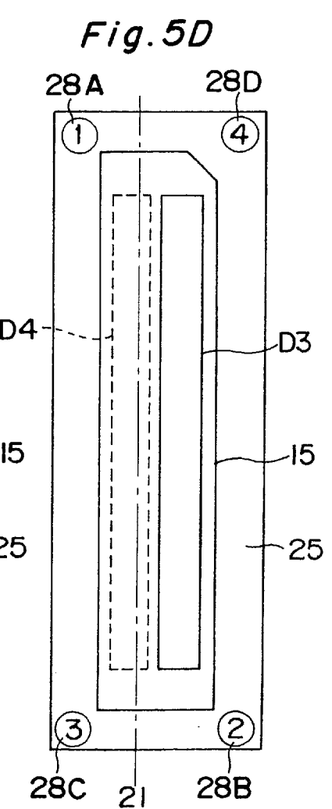

Likewise, when the second surface region D2 of the transparent substrate has been worn out to complete its service life, the transparent substrate 15 is turned upside down relative to the frame so that the corner cutout faces the third indicator 28C as illustrated by ③ of the frame as shown in FIG. 5C. This causes the inactive surface regions D1 and D2 to position outside the contact region and, instead, the third active surface region is newly located in the contact region.

Figure 3C:
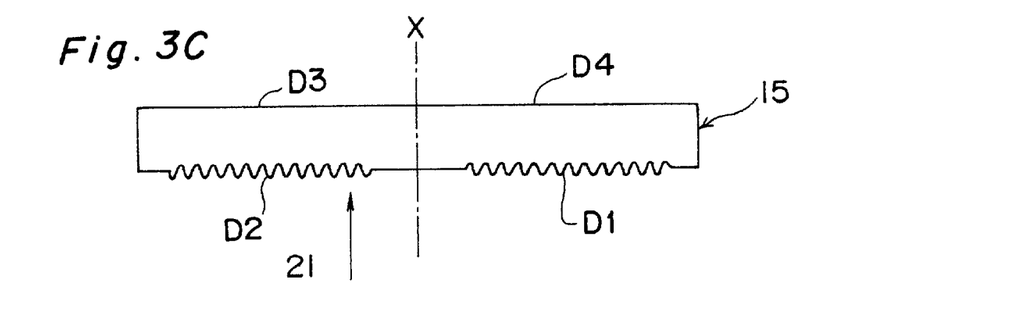
Figure 3D:
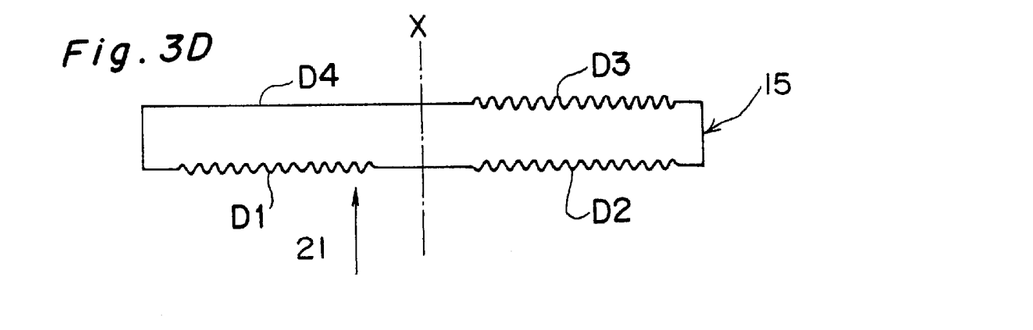

In this condition, as best shown in FIG. 3C, although the inactive second surface region D2 opposes to the reading position 21, it makes no contact with the original document 9. Thus, prior to positioning the transparent substrate 15 to the support frame 25, the inactive second surface region D2 is cleaned up by the use of suitable cleaning liquid or material to remove the spotted ink or foreign matters therefrom. Therefore, the inactive surface region D2 in the reading region no longer makes contact with the document and then provides any disadvantages to the subsequent image reading.

Next, when the third surface region D3 of the substrate 15 has been worn out to complete its service life, the transparent substrate 15 is turned around relative to the support frame 25 as shown in FIGS. 5C and 5D and FIGS. 4C and 4D, so that the corner cutout faces the fourth indicator 28D as shown by ④ of the support frame 25. This causes the inactive surface regions D1 to D3 to position outside the contact region and, instead, the active surface portion D4 is newly located in the contact region.

As described above, the transparent substrate 15 is used so that four active surface regions are in turn positioned in the contact region, which quadruples the service time of the transparent substrate 15. Also, the combination of the indicators 27 of the transparent substrate 15 and the support frame 25 clearly indicates the next arrangement of the transparent substrate 15 after each completion of service life of the surface region.

Embodiment 2

Referring to FIGS. 2A, 2B, 6 and 7, a process to form the protection layer 24 on the transparent substrate 15 will be described hereinafter.

Firstly, prepared is any solvent including alcohol such as ethanol, methanol and propanol, aliphatic hydrocarbon such as hexane and n-hexane, or similar solvent thereto. Ethanol is preferable to be used in view of a working environment. Then, a mixture of a compound with a per-fluoro-alkyl group and a silicone oil are dispersed in the solvent. Since the mixture is substantially insoluble with ethanol, 0.1 wt % through 1.0 wt % of the mixture based upon the solvent is sufficiently blended so as to produce an antifoulant, in which the mixture is physically dispersed with the solvent. Then the antifoulant is applied to the glass plate 22 to form the protection layer 24. There are various silicone oils available, including dimethyl-silicone oil, methyl-phenyl-silicone oil, methyl-hydrogen-silicone oil, alkyl-modified silicone oil, chloro-alkyl-modified silicone oil, chloro-phenyl-modified silicone oil, fattyacid-modified silicone oil, polyether-modified silicone oil, alkoxyl-modified silicone oil, carbinol-modified silicone oil, amino-modified silicone oil.

Among them, preferably, amino-modified silicone oil is used, and more preferably, amino-modified silicone oil with a lateral chain denatured by monoamino-alkyl group or diamino-alkyl group. Also, there are several compounds with a per-fluoro-alkyl group available, such as per-fluoro-alkyl-polyether and polymer of unsaturated ester having per-fluoro-alkyl group, and among them, per-fluoro-alkyl-polyether is advantageously used.

Preferably, per-fluoro-alkyl-polyether has a chemical formula indicated below, where the natural number n is selected in the range from 7 to 150.

$$F-[CF.(CF_3)-CF_2-O]_n-C_2F_5$$

In case where the natural number n is less than 7, the endurance of the protection layer 24 is insufficient during repeatedly reading the original document 9. On the other hand, where the natural number n is greater than 150, the antifoulant is so viscous that an application thereof on the transparent substrate 15 cannot be achieved in a smooth manner. It is necessary to control the natural number n within the range of 7 through 150 so that the endurance of the protection layer 24 is kept sufficiently high and the antifoulant can smoothly be applied on the transparent substrate 15.

It is understood that when ethanol is replaced with chloro-fuluoro-carbon or substitutes thereof, the aforementioned mixture can thoroughly be dissolved. However, the chloro-fuluoro-carbon or substitutes thereof are well known as chemicals which destroy the ozone shield in the atmosphere, thus, use of such chemicals are prohibited or limited by international protocols or domestic laws in many countries, thus, it should be avoided to use the chloro-fuluoro-carbon or substitutes thereof.

A volumetric mixture ratio of a compound with per-fluoro-alkyl group relative to silicone oil is preferably 1:4 through 4:1. As the details are described below, when the volumetric mixture ratio is less than 1:4 causing a lack of per-fluoro-alkyl-polyether so that the endurance of the protection layer 24 is substantially reduced. As a result, when the images of several thousands of original documents are repeatedly picked up, the protection layer 24 is worn out to cause many black lines on the reproduced images. On the other hand, the volumetric mixture ratio is greater than 4:1 causing a lack of silicone oil so that the friction coefficient between the original document 9 and the transparent substrate 15 is increased, thereby resulting in many jams. Therefore, in order to prevent the black lines on the reproduced images as well as jams, it is advantageous to keep the volumetric mixture ratio of the compound with per-fluoro-alkyl group relative to silicone oil to fall within the range of 1:4 through 4:1.

As described above, FIGS. 2A and 2B show the transparent substrate 15 according to the present invention. FIG. 2A shows a structure of the transparent substrate 15 comprising a glass plate 22, transparent conductive layers 23 and protection layers 24 formed on both surfaces of the glass plate 22. Meanwhile, FIG. 2B shows a structure of the transparent substrate 15 comprising a glass plate 22 and protection layers 24 formed on both surfaces of the glass plate 22. The structure of the transparent substrate 15 illustrated in FIG. 2B can be manufactured at reasonable cost in comparison with one illustrated in FIG. 2A, and can be used advantageously when the transporting speed is slow, or when an additional antistatic means is provided.

Now, the details of the evaluation tests for prototypes (referred to simply as "Samples") of the transparent substrates coated with the antifoulants including the compound with per-fluoro-alkyl group and silicone oil will be described hereinafter. This is the ground for concluding that advantageously the volumetric mixture ratio of the compound with per-fluoro-alkyl group relative to silicone oil group falls within the range of 1:4 through 4:1. In the evaluation tests, several kinds of antifoulants are produced with different volumetric mixture ratios of the compound with per-fluoro-alkyl group and silicone oil, and are applied to the surfaces of the transparent substrates 15 so as to produce various Samples. Then, the number of black lines appeared on the reproduced images are counted and the friction coefficients on Samples of transparent substrates 15 are measured.

Figure 6:
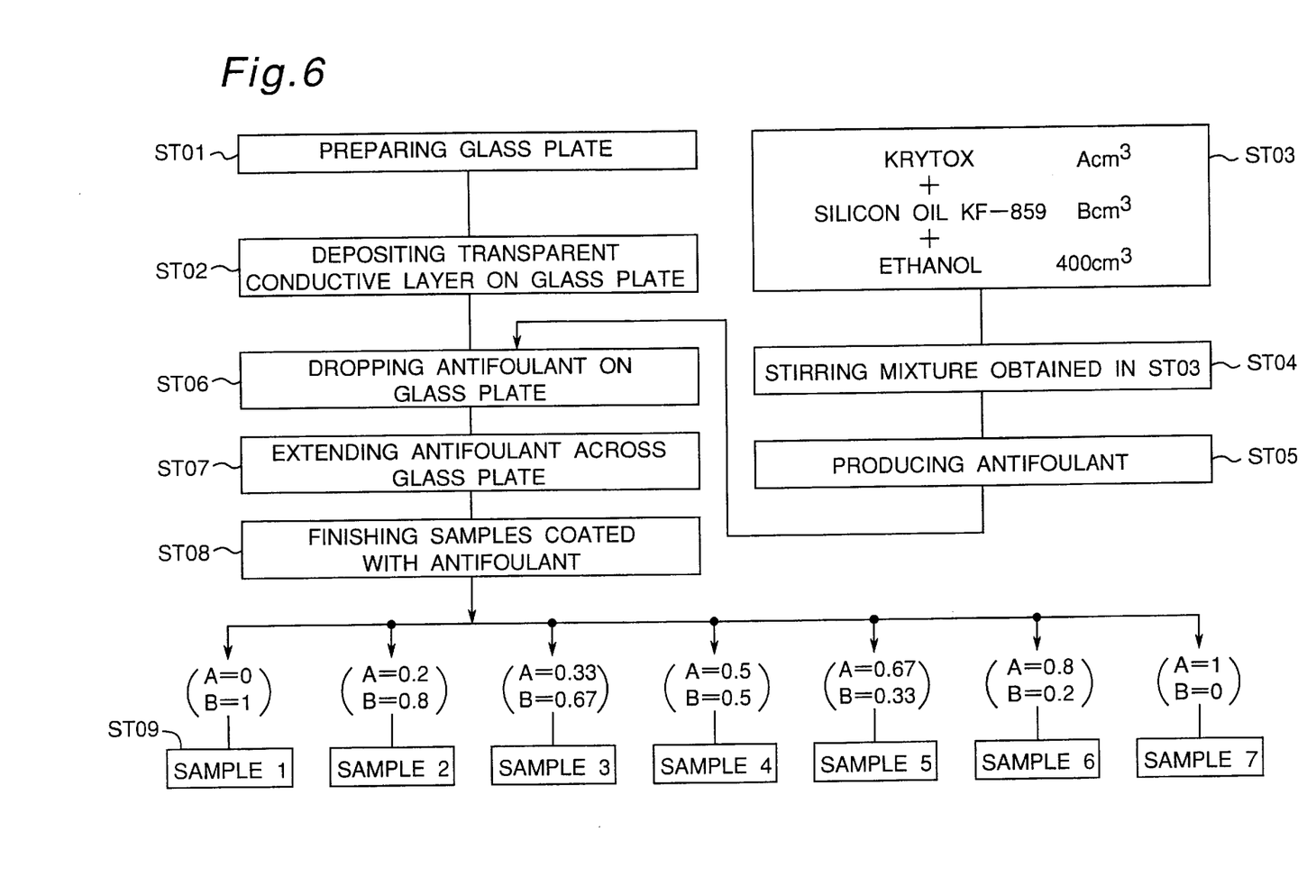
FIG. 6 is a flowchart diagram of a process for making antifoulants with various volumetric mixture ratios of perfluoro-alkyl-polyether and amino-modified poly-dimethyl-siloxane, which are applied to Samples of the transparent substrate with a cross sectional structure shown in FIGS. 2A.
Figure 7:
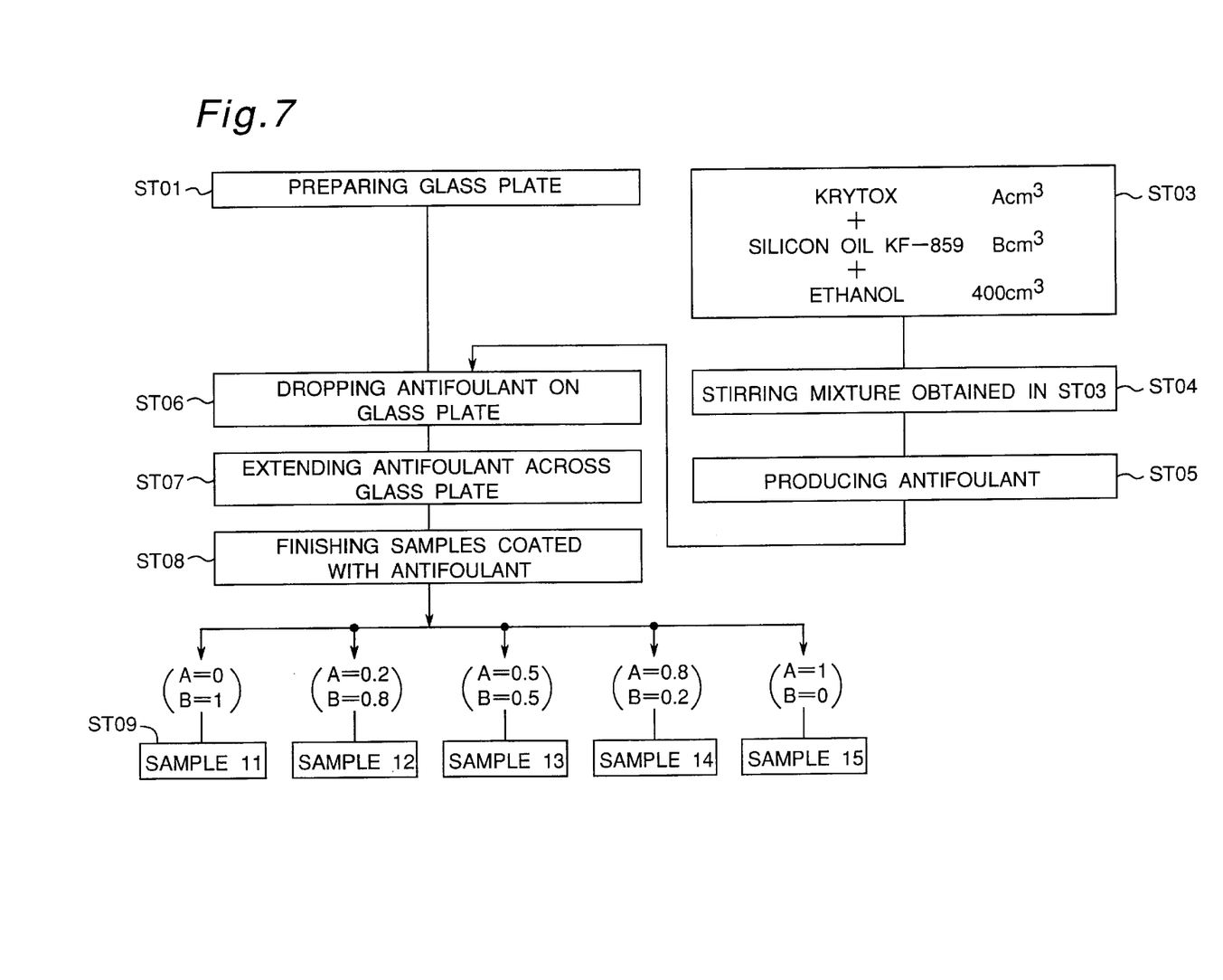
FIG. 7 is a flowchart diagram of a process for making antifoulants with various volumetric mixture ratios of perfluoro-alkyl-polyether and amino-modified poly-dimethyl-siloxane, which are applied to Samples of the transparent substrate with a cross sectional structure shown in FIGS. 2B.

FIGS. 6 and 7 are flowcharts showing the processes used for making Samples of transparent substrates 15 shown in FIG. 2A and FIG. 2B, respectively, varying the volumetric mixture ratios of the compound with per-fluoro-alkyl group relative to silicone oil. Tables 1 and 2 show the numbers of black lines appeared on the reproduced images and the friction coefficients of Samples coated with antifoulants of the mixture having different volumetric mixture ratios, as well as the evaluations for each Sample.

First Evaluation Test

As to Samples having the structure shown in FIG. 2A, a first process for making Samples coated with antifoulants having different volumetric mixture ratios will be described hereinafter. In the following description, step numbers are denoted as "STXX", for example, step 1 is denoted as "ST01", which corresponds to the "STXX" illustrated in FIG. 6.

ST01: Preparing a glass plate 22 having 350 mm length, 46 mm width and 3 mm thickness.

ST02: Depositing a transparent conductive layer 23 by sputtering a layer, which has a thickness of 10 nm and a surface resistance of 200 ohms/cm$^2$, and made of tin-doped indium.

ST03: a) Sampling, by a syringe, "A" cm$^3$ of per-fluoro-alkyl-polyether, commercially available from DuPont under the trade name "KRYTOX® 1525", referred to simply as "Krytox", and "B" cm$^3$ of poly-dimethyl-siloxane denatured with an amino group, commercially available from Shin-Etsu Chemical Co. Ltd., under the trade name "Silicone oil KF-859", which is referred to simply as "Silicone oil KF-859", b) Pouring the sampled "A" cm$^3$ of Krytox and "B" cm$^3$ of Silicone oil KF-859 into a beaker, and c) Adding 400 cm$^3$ of ethanol into the beaker to produce the antifoulant.

ST04: Stirring the content in the beaker with a magnetic stirer.

ST05: The antifoulant as a source material for forming protection layer 24 is completed by aforementioned steps ST01 through ST04.

ST06: Dropping small amount of the antifoulant completed at ST05 on the transparent conductive layer 23 of the transparent substrate 15 prepared at ST02.

ST07: Extending the antifoulant across the transparent substrate 15 by using a wiping cloth.

ST08: Finishing the transparent substrate by using a sponge block surrounded by the wiping cloth.

ST09: Obtaining "Sample 1" by applying the antifoulant produced in ST03 through ST05, wherein the volumetric ratio of A:B is 0:1. Also, "Sample 2" through "Sample 7" are obtained by applying the antifoulant produced in ST03 through ST05, wherein the volumetric ratios of A:B are 0.2:0.8, 0.33:0.67, 0.5:0.5, 0.67:0.33, 0.8:0.2 and 1:0, respectively.

Thus, a plurality of Samples (seven Samples in this instance) are produced. The process for producing Samples is exemplary and not intended to limit the scope of the present invention. For example, ST03 can be performed prior to ST01.

Each of Samples 1 through 7 of the transparent substrate 15 is secured with the support frame 25 of the image reader 1, which reads a predetermined number of original documents 9. Then, the black lines are counted on the reproduced images and the active friction coefficients are measured.

The active friction coefficients can be measured in various ways. For example, a surfacing tribometer commercially available from Shinto-Kagaku Co. Ltd., located in Tokyo, JAPAN, under the brand name "HEIDON-14" can be utilized to measure the active friction coefficients. The document 9 having an area of 20 mm×100 mm is used as a plane pad to measure the friction coefficients. The plane pad has an area of 20 mm×19 mm actually contacting with Samples, and a vertical load of 100 grams is weighted on Samples. Then, while the plane pad is being drawn at a scanning rate of 50 mm per minute, the active friction coefficient is measured by the surfacing tribometer.

Table 1 illustrates numbers of black lines appeared on the reproduced images with respect to Samples 1 through 7, when $5\times10^3$, $20\times10^3$, $60\times10^3$ and $100\times10^3$ sheets of the original documents 9 have been transported by the image reader 1, and as well as the active friction coefficients when $10\times10^3$ sheets of the originals 9 have been transported. Also, Table 1 indicates the entire evaluation for Samples 1 through 7 as transparent substrates as "A (excellent)", "B (good)" and "C (improvements required)". Needless to say, it is more preferable to have less black lines appeared on the reproduced images, and lower active friction coefficients so as to prevent the jams.

few of black lines appear on the reproduced images, Samples are acceptable for use as a transparent substrate 15. Also, the active friction coefficient is 0.05, which is low enough to prevent the jams. Thus, the evaluation of Sample 2 is good.

The protection layer 24 of Sample 3 is made of the antifoulant comprising one volumetric dose of Krytox and two volumetric doses of Silicone oil KF-859. With use of Sample 2, no black line appears on the reproduced images even after transporting $100\times10^3$ sheets of the original documents 9. Also, the active friction coefficient is 0.06, which is low enough to avoid the jams. Thus, the evaluation of Sample 3 is excellent.

The protection layer 24 of Sample 4 is made of the antifoulant comprising one volumetric dose of Krytox and one volumetric dose of Silicone oil KF-859. With use of Sample 4, only one black line appears on the reproduced images after picking up $100\times10^3$ sheets. Also, the active friction coefficient is 0.06, which is low enough to prevent the jams. Thus, the evaluation of Sample 4 is good.

The protection layer 24 of Sample 5 is made of the antifoulant comprising two volumetric doses of Krytox and one volumetric dose of Silicone oil KF-859. With use of Sample 5, only two black lines appear on the reproduced images after reading $100\times10^3$ sheets. Also, the active friction coefficient is 0.07, which is low enough to preclude the jams. Thus, the evaluation of Sample 5 is good.

The protection layer 24 of Sample 6 is made of the antifoulant comprising four volumetric doses of Krytox and one volumetric dose of Silicone oil KF-859. With use of Sample 6, only three black lines appear on the reproduced images after reading $100\times10^3$ sheets. Also, the active friction coefficient is 0.06, which is low enough to prevent the jams. Thus, the evaluation of Sample 6 is good.

TABLE 1

| Sample Number | Structure | Volumetric ratios of SA and SB | | Numbers of black lines after reading documents | | | | active friction coefficients | result | Evaluation |
| --- | --- | --- | --- | --- | --- | --- | --- | --- | --- | --- |
| | | SA | SB | $5\times10^3$ sheets | $20\times10^3$ sheets | $60\times10^3$ sheets | $100\times10^3$ sheets | $10\times10^3$ sheets | | |
| Sample 1 | FIG. 1 | 0 | 1 | 1 line | 6 lines | — | 20 lines | 0.05 | many lines | C |
| Sample 2 | FIG. 1 | 1 | 4 | 0 | 0 | 1 line | 2 | 0.05 | OK | B |
| Sample 3 | FIG. 1 | 1 | 2 | 0 | 0 | 0 | 0 | 0.06 | OK | A |
| Sample 4 | FIG. 1 | 1 | 1 | 0 | 0 | 1 | 1 | 0.06 | OK | B |
| Sample 5 | FIG. 1 | 2 | 1 | 0 | 1 | — | 2 | 0.07 | OK | B |
| Sample 6 | FIG. 1 | 4 | 1 | 0 | 1 | — | 3 | 0.06 | OK | B |
| Sample 7 | FIG. 1 | 1 | 0 | 0 | 0 | 1 | 1 | 0.30 | jam trouble | C |

SA: Krytox
SB: Silicon Oil KF-859

The protection layer 24 of Sample 1 is made of the antifoulant comprising Silicone oil KF-859 but no Krytox. With use of Sample 1, one black line appears on the reproduced images after transporting only $5\times10^3$ sheets of the original documents 9, further, 6 and 20 black lines appear on the reproduced images after transporting $20\times10^3$ sheets and $100\times10^3$ sheets, respectively. The active friction coefficient is 0.05, which is low enough to preclude the jams. However, since the extensive number of black lines appear on the reproduced images, Sample 1 is evaluated that it is required to be improved.

The protection layer 24 of Sample 2 is made of the antifoulant comprising one volumetric dose of Krytox and four volumetric doses of Silicone oil KF-859. With use of Sample 2, only two black lines appear on the reproduced images after transporting $100\times10^3$ sheets. In case where a The protection layer 24 of Sample 7 is made of the antifoulant comprising Krytox but no Silicone oil KF-859. With use of Sample 7, only one black line appears on the reproduced images after reading $100\times10^3$ sheets. However, the active friction coefficient is 0.30, which is quite high to frequently cause the jams. Thus, Sample 7 is evaluated that it is required to be improved.

As described above, the evaluation test reveals that Samples 2 through 6 can be used to prevent black lines on the reproduced images, and jams. The protection layer 24 of Samples 2 through 6 are formed of the antifoulant comprising a mixture of Krytox and Silicone oil KF-859, in which the volumetric ratio therebetween falls within the range of 1:4 through 4:1.

Since per-fluoro-alkyl-polyether, which is one of the compound with per-fluoro-alkyl group, contains fluorine, it is chemically inert, thereby to keep the spot (blur and/or dust) away from the transparent substrate 15.

Meanwhile, among the silicone oils, in particular, amino-modified silicone oil, which is highly durable, tends to strongly attach onto the glass palate 22 or the transparent conductive layer 23. Therefore, when the protection layer 24 is made of the antifoulant containing silicone oil, the protection layer 24 endures the friction force generated during repeatedly transporting original documents 9, resulting in delaying the abrasion thereof. Since the antifoulants of Samples 2 through 6 contains per-fluoro-alkyl-polyether for preventing the spots from adhering thereto, and silicone oil for delaying the abrasion thereof, Samples 2 through 6 can lead the advantageous results as described above.

Second Evaluation Test

Next, with use of transparent substrates 15 having structures as illustrated in FIG. 2B, where only the protection layers 24 are formed on the glass plate without transparent conductive layers, another evaluation tests are performed. Similar Samples 11 through 15 are made of the antifoulant having different volumetric ratios of Krytox and Silicone oil KF-859 and then, numbers of black lines are counted and the active friction coefficients are measured for evaluating each Sample.

As indicated above, Samples 11 though 15 used for the second evaluation test are similar to Samples 1 through 7 used for the first evaluation test except that they have no transparent conductive layers 23. The steps to make Samples 11 though 15 are illustrated in FIG. 7, and since they are similar to ones shown in FIG. 6 without ST02, no details should further be described.

Samples 11 through 15 are made by applying, on the glass plate 22, the antifoulant produced in ST03 through SR05, wherein the volumetric ratios of A:B are 0:1, 0.2:0.8, 0.5:0.5, 0.8:0.2 and 1:0, respectively.

As below, Table 2 illustrates numbers of black lines appeared on the reproduced images with respect to Samples 11 through 15, which are counted after $100 \times 10^3$ sheets of the original documents 9 are transported by the image reader 1, and as well as the active friction coefficients after $10 \times 10^3$ sheets of the original documents 9 are transported. Also, Table 2 shows the entire evaluation for Samples 11 through 15 as transparent substrates as "B (good)" and "C (improvements required)".

numbers of black lines appeared on the reproduced images with use of Samples 12 through 14 are slightly greater than those with use of Samples 2 through 7, still, they fall within the acceptable range. Also, the active friction coefficients of Samples 12 through 14 are increased, yet they are not substantial to cause many jams.

As described above, the transparent substrates of Samples 12 through 14 can keep the spots away therefrom and also prevent the jams. Samples 12 through 14 are made by applying antifoulant of Krytox and Silicone oil KF-859, in which the volumetric ratios therebetween fall within the rage of 1:4 through 4:1, and by finishing the same.

Samples obtained in the second evaluation test have the active friction coefficients higher than those of Samples obtained in the first evaluation test. It is understood that this is because the transparent conductive layers 23 of Samples obtained in the first evaluation test have uneven surfaces, which grasp the antifoulant thereon in a more preferable manner.

Krytox available from DuPont may be substituted for DEMNAM® available from Daikin Industries, Ltd., Osaka JAPAN, which is another form of per-fluoro-alkyl-polyether. Also, Silicone oil KF-859 may be substituted for Silicone oil KF-865 also available from Shin-Etsu Chemical Co. Ltd., which is another form of amino-modified silicone oil. Again, similar results are obtained by similar evaluation tests with Demnam and Silicone oil KF-865. Therefore, the compound with per-fluoro-alkyl group and silicone oil, which composes the antifoulant, should not be limited to Krytox and Silicone oil KF-859, respectively.

What is claimed is:

1. An image reader, comprising:
    a transparent substrate having a first surface and a second surface opposing to said first surface, said first surface having a protection layer;
    a document transporting device for transporting a document along said first surface of said transparent substrate; and
    an image pickup device positioned adjacent to said second surface, said image pickup device for picking up an image of the document transported along said first surface of said transparent substrate;
    wherein said transparent substrate can be turned around relative to said image pickup device,

TABLE 2

| Sample | | Volumetric ratios of SA and SB | | Numbers of black lines after reading documents | active friction coefficients | | |
|---|---|---|---|---|---|---|---|
| Number | Structure | SA | SB | $100 \times 10^3$ sheets | $10 \times 10^3$ sheets | result | Evaluation |
| Sample 11 | FIG. 2 | 0 | 1 | 22 lines | 0.07 | many lines | C |
| Sample 12 | FIG. 2 | 1 | 4 | 2 | 0.08 | OK | B |
| Sample 13 | FIG. 2 | 1 | 1 | 2 | 0.08 | OK | B |
| Sample 14 | FIG. 2 | 4 | 1 | 3 | 0.09 | OK | B |
| Sample 15 | FIG. 2 | 1 | 0 | 2 | 0.35 | jam trouble | C |

SA: Krytox
SB: Silicon Oil KF-859

The protection layer 24 of Sample 11 are made of the antifoulant comprising Krytox but no Silicone oil KF-859, and the protection layer 24 of Sample 15 are made of the antifoulant comprising Silicone oil KF-859 but no Krytox. For the same reason as indicated above for the first evaluation test, Samples 11 and 15 are evaluated that they are required to be improved. On the other hand, Samples 12 through 14 are evaluated as good. Because even though the wherein said transparent substrate has a first indicator showing how said transparent substrate has been turned around relative to said image pickup device.

2. The image reader according to claim 1,
    wherein said first surface of said transparent substrate has a transparent conductive layer and said protection layer formed on said transparent conductive layer.

3. The image reader according to claim 1, further comprising a support frame for supporting said transparent substrate, said support frame having a second indicator showing an arrangement order of said transparent substrate in combination with said first indicator of said transparent substrate.

4. The image reader according to claim 1,
wherein said protection layer contains a silicone oil and a compound with per-fluoro-alkyl group.

5. The image reader according to claim 4,
wherein said silicone oil is an amino-modified silicone oil and said compound with per-fluoro-alkyl group is a per-fluoro-alkyl-polyether.

6. The image reader according to claim 1,
wherein said second surface of said transparent substrate has said protection layer,
wherein said transparent substrate can be used upside down relative to said image pickup device.

7. The image reader according to claim 6,
wherein said second surface of said transparent substrate has a transparent conductive layer and said protection layer formed on said transparent conductive layer.

8. The image reader according to claim 6, further comprising a support frame for supporting said transparent substrate, said support frame having a second indicator showing an arrangement order of said transparent substrate in combination with said first indicator of said transparent substrate.

9. The image reader according to claim 6,
wherein said protection layer contains a silicone oil and a compound with per-fluoro-alkyl group.

10. The image reader according to claim 9,
wherein the silicone oil is an amino-modified silicone oil and the compound with per-fluoro-alkyl group is a per-fluoro-alkyl-polyether.

11. An image reader, comprising:
a transparent substrate having a first surface and a second surface opposing to said first surface, said first surface having a protection layer;
a document transporting device for transporting a document along said first surface of said transparent substrate; and
an image pickup device positioned adjacent to said second surface, said image pickup device for picking up an image of the document transported along said first surface of said transparent substrate;
wherein said protection layer contains a silicone oil and a compound with per-fluoro-alkyl group.

12. The image reader according to claim 11,
wherein a volumetric ratio of the silicone oil relative to the compound with per-fluoro-alkyl group is within a range between 1:4 and 4:1.

13. The image reader according to claim 11,
wherein said first surface of said transparent substrate has a transparent conductive layer and said transparent protection layer formed on said transparent conductive layer.

14. The image reader according to claim 11,
wherein the silicone oil is an amino-modified silicone oil and the compound with per-fluoro-alkyl group is a per-fluoro-alkyl-polyether.

15. The image reader according to claim 14,
wherein the per-fluoro-alkyl-polyether is represented as a following chemical formula, and n represents a natural number within the range between 7 and 150.

16. The image reader according to claim 11,
wherein the silicone oil is an amino-modified silicone oil.

17. The image reader according to claim 11,
wherein the amino-modified silicone oil includes a monoamino-alkyl group and a diamino-alkyl group.

18. The image reader according to claim 11,
wherein the silicone oil is an amino-modified silicone oil and the compound with per-fluoro-alkyl group is a per-fluoro-alkyl-polyether.

19. The image reader according to claim 18,
wherein the per-fluoro-alkyl-polyether is represented as a following chemical formula, and n represents a natural number within the range between 7 and 150.

20. The image reader according to claim 18,
wherein a volumetric ratio of the amino-modified silicone oil relative to the per-fluoro-alkyl-polyether is within a range between 1:4 and 4:1.

21. The image reader according to claim 11,
wherein said second surface of said transparent substrate has a protection layer which contains a silicone oil and a compound with per-fluoro-alkyl group.

22. The image reader according to claim 21,
wherein said second surface has a transparent conductive layer and said protection layer formed on said transparent conductive layer.

23. The image reader according to claim 21,
wherein the silicone oil is an amino-modified silicone oil and the compound is a per-fluoro-alkyl-polyether.

* * * * *